United States Patent
Alajääski et al.

[11] Patent Number: 5,547,083
[45] Date of Patent: Aug. 20, 1996

[54] APPARATUS FOR TREATING FIBER SUSPENSION

[75] Inventors: Timo Alajääski; Kalevi Laakso; Antero Laine; Risto Ljokkoi, all of Karhla, Finland

[73] Assignee: A. Ahlstrom Corporation, Noormarkku, Finland

[21] Appl. No.: 318,719

[22] PCT Filed: Apr. 8, 1993

[86] PCT No.: PCT/FI93/00151

§ 371 Date: Oct. 13, 1994

§ 102(e) Date: Oct. 13, 1994

[87] PCT Pub. No.: WO93/22494

PCT Pub. Date: Nov. 11, 1993

[30] Foreign Application Priority Data

Apr. 23, 1992 [FI] Finland ................................ 921801

[51] Int. Cl.$^6$ ........................................ B07B 1/04
[52] U.S. Cl. ............... 209/273; 209/306; 162/55
[58] Field of Search ................... 209/268, 270, 209/273, 303, 304, 305, 306; 210/413–415; 162/55

[56] References Cited

U.S. PATENT DOCUMENTS

| | | |
|---|---|---|
| 2,835,173 | 5/1958 | Martindale . |
| 3,363,759 | 1/1968 | Clarke-Pounder . |
| 3,400,820 | 9/1968 | Nelson . |
| 3,437,204 | 4/1969 | Clarke-Pounder . |
| 4,188,286 | 2/1980 | Holz ........................................ 209/273 |
| 4,193,865 | 3/1980 | Aario . |
| 4,202,761 | 5/1980 | Holz . |
| 4,894,147 | 1/1990 | Rajala ..................................... 209/273 |
| 4,981,583 | 1/1991 | LeBlanc . |
| 5,000,842 | 3/1991 | Ljokkoi . |
| 5,176,261 | 1/1993 | Holz . |
| 5,224,603 | 7/1993 | Hanana et al. ...................... 209/273 X |

FOREIGN PATENT DOCUMENTS

| | | |
|---|---|---|
| 0436888 | 12/1990 | European Pat. Off. . |
| 3006482 | 10/1981 | Germany . |
| 90/04807 | 5/1990 | WIPO . |

*Primary Examiner*—David H. Bollinger
*Attorney, Agent, or Firm*—Nixon & Vanderhye P.C..

[57] ABSTRACT

An apparatus for screening and thickening cellulose pulp keeps cleaner than conventional apparatus. Pulse members in accordance with the prior art are constructed so that when the capacity of the screening apparatus is increased, for example by using greater pressure differences or the cleanliness of the accept is increased by decreasing the size of the perforations or slots, a situation is created in which the screen cylinder tends to clog. The pulse member of the present screening apparatus subjects the screen cylinder or screen surface to a pulse cleaning action so that there is a minimal possibility to allow the pressure effect to "escape" past the area being cleaned. The higher the consistency of the fiber matting is or the worse the screen surface is clogged, the stronger the pulse cleaning of the screen surface.

40 Claims, 9 Drawing Sheets

APPARATUS FOR TREATING FIBER SUSPENSION

CROSS REFERENCE TO RELATED APPLICATION

This application is the U.S. National Phase of PCT International Application PCT/FI93/00151 filed Apr. 8, 1993.

BACKGROUND AND SUMMARY OF THE INVENTION

The present invention relates to an apparatus for treating fiber suspension. Said apparatus is especially applicable for screening and also thickening pulp in the wood processing industry. More precisely the inventive concept of the apparatus of the invention is related to the pulse member construction of the screen or thickener being used.

There are in principle two known types of pulse members, which both are generally used and the purpose of which is, as known, to maintain the screen surface clear, in other words, to prevent the formation of a fiber matting on the screen surface. One type is exemplified, for example, by a rotor in accordance with U.S. Pat. No. 4,193,865, in which said rotor is rotatably mounted within a stationary screen cylinder, comprising blades located close to the surface of the screen cylinder. In accordance with said patent the blades form an angle with the axis of the cylinder. The screen surface is subjected to pressure pulses by the moving blades clearing the openings of the screen surface. There are also embodiments that have blades on both sides of the screen cylinder. Consequently, the suspension being treated is fed either to the inside or to the outside of the cylinder and the accept is discharged from the outside or from the inside of the cylinder, respectively.

Another rotor type worth mentioning is, for example, one in accordance with U.S. Pat. No. 3,437,204, in which the rotor is a substantially cylindrical closed body, the surface of which is provided with almost hemispherical protrusions, so called bulges. In said apparatus the pulp is fed to a treatment space between the rotor cylinder and the screen cylinder outside thereof, whereby the protrusions of the rotor, the bulges, act both to press the pulp against the screen cylinder with the leading surface and to draw off the fiber flocs from the perforations of the screen cylinder with its trailing surface. Because this kind of construction has a highly thickening effect on the pulp, there are in the above mentioned arrangement three dilution water connections arranged at different heights on the screen cylinder, so as to make the screening of fiber suspension take place satisfactorily. A corresponding "bump rotor" is disclosed also in U.S. Pat. No. 3,363,759.

Also, other embodiments of the above mentioned cylindrical rotor are known, in connection with which many kinds of protrusions facing the screen cylinder may be used as disclosed in various publications.

DE application 30 06 482 discloses a knot separator, in which on the surface of a cylindrical rotor there are ploughlike protrusions, made of plate material, by which the pulp between the rotor and the screen cylinder is subjected to strong mixing forces so as to make fibers pass through the screen cylinder most effectively, and knots, shives and such separate therefrom.

U.S. Pat. No. 3,400,820 discloses a rotor being formed of eccentric portions or lobes. The slope of the fluid contacting surface of the rotor is gradual in the increasing as well as decreasing clearance regions. The slope angle is less than 15° relative to the direction of the movement. Since the slope is equal in both directions the operation of the rotor is far from optimal. The decreasing clearance presses the pulp towards the screen surface such that the openings of the screen cylinder easily clog, whereby the portion having the increasing clearance is not able to create a negative pressure sufficient to draw the fiber agglomerations out of the openings. Yet another drawback of the structure shown in the patent is, on the one hand, its tendency to crush all the impurities like knots etc. between the rotor and the screen surface. On the other hand, if the impurities are hard, such as stone or metal particles, there is a risk that the rotor presses the particles through the screen cylinder.

U.S. Pat. Nos. 4,188,286 and 4,202,761 disclose a screen apparatus, in which there is a rotatable cylindrical rotor inside the screen cylinder. There are protrusions arranged on the rotor facing the screen cylinder side, which protrusions have a V-shaped axial cross section so that on one rotational edge of the rotor there is a surface coming closest to the screen cylinder and being parallel to the rim of the rotor, and having an end surface substantially perpendicular to the surface of the rotor. These protrusions are arranged on the surface of the rotor cylinder axially in a certain angle position so that all protrusions of the rotor are in the same disposition with respect to the shaft of the rotor.

According to the prior art publications pulp can be fed to this apparatus to either side of the screen cylinder. If pulp is fed to the outside of the screen cylinder and accept is discharged from the interior of the screen cylinder, in other words from the rotor side, the rotational direction of the rotor is such that the accept is subjected by the angle position of the protrusions to a force component directed downwards and that said inclined/ascending surface functions as a front surface. If, however, pulp is fed between the rotor and the screen cylinder, in other words the accept is discharged from exterior of the screen cylinder, the rotational direction is opposite to the former. The protrusions tend to slow down the downward pulp flow and the surface upright to the surface of the rotor cylinder functions as a front surface.

Practical experience in the industry has, however, proved that the above mentioned arrangements do not operate satisfactorily in all circumstances. The apparatus also tends to dilute the accept and is therefore not applicable in cases where pulp with constant consistency is needed. Because the foils in the foil rotors are considerably far apart (4 to 8 foils), fiber matting will always be formed on the screen cylinder before the next foil wipes it off. Thus the use of a screen is not efficient. Moreover, said rotor type is expensive to manufacture because of the accurate dimensioning requirements of the rotor and the careful finishing of it. The ability of the foil to wipe off the fiber suspension, which accumulates on the surface of the screen cylinder is relatively poor. Further, the conventional foil resembling a wing of an aeroplane of its cross-section causes problems in the screening. It has been noted that the curved front edge, which is flow-dynamically appropriately designed causes the suspension to be treated to clog between the foil and the screen surface, in other words it causes a strong pressure stroke, due to which also impurities, such as shives tend to penetrate the openings of the screen surface. In order to be able to draw off such shives which are pressed with high pressure to the openings, a very strong negative pressure pulse is required.

It is typical of all above described pulse members that when aiming at the increase of the screening capacity, for example, by using higher pressure differences or when aiming at the increase of the purity of the accept by diminishing the size of the perforation or slot one comes to a point where the screen cylinder tends to clog. The problem is thus maintaining the screen cylinder clear, the ensuring of which offers the opportunity to optimize other factors connected to the screening, which, however, the following patent publication well illustrates. The most developed embodiment presently available in the market is a method in accordance with FI Patent 77279 and an apparatus realizing said method. It is characteristic of the method in accordance with said patent that the fiber suspension is subjected to axial forces varying in strength and effective direction, the direction and strength of which depend on the axial position between the effective point and the counter surface of the screen cylinder, and which are used to change the axial speed profile of the fiber suspension yet maintaining the direction of the flow continuously towards the discharge end.

Better screening results are obtained with the above described apparatus than the previous prior art apparatuses, in Other words capacity, clarity, etc. according to the need. However, said apparatus is also liable to problems, when it is tended to utilize the most of the characteristics thereof.

The present invention relates to a pulse member of a screener, which has the characteristic feature of subjecting the screen surface to a pulse clearing said screen surface without allowing the pressure effect "slip away" past the point being cleaned. It is also characteristic of the pulse member in accordance with the present invention that the pulse clearing the screen surface is the stronger the thicker the matting is or the worse the screen surface is clogged.

It is characteristic of an embodiment of the apparatus in accordance with the present invention being provided with a pulse member with a continuous surface having a leading edge and a trailing edge facing the screen cylinder, and of which screen cylinder and pulse member at least one is rotatably mounted to the shaft that said at least one continuous surface facing said screen cylinder is provided with at least two substantially circumferentially extending channels having a cross-sectional area widening towards said trailing edge by means of which channels said surface of the screen cylinder is subjected to a strong suction effect in order to maintain said screen surface clean.

It is also characteristic of a second embodiment of the apparatus in accordance with the present invention being provided with a pulse member with a continuous surface being provided with at least one element having a leading surface and a trailing surface that said element is provided with at least one substantially circumferentially extending channel having a cross-sectional area widening along said trailing surface away from said leading surface by means of which channels the surface of the screen cylinder is subjected to a strong suction effect in order to maintain said surface clean.

BRIEF DESCRIPTION OF THE DRAWINGS

The apparatus in accordance with the present invention is described more in detail below, by way of example, with reference to the accompanying drawings, in which FIG. 1 is a part sectional view of a screening or thickening apparatus, which the pulse member arrangement in accordance with the invention is intended for;

FIG. 6 is a graph showing the accept flows of pulp as a function of pressure difference when comparing a rotor in accordance with FIG. 4c with a conventional rotor illustrated in FIG. 2a; and FIG. 7 is a graph showing the energy consumption as function of pressure difference when comparing the rotor in accordance with FIG. 4c with a conventional rotor illustrated in FIG. 2a.

DETAILED DESCRIPTION OF THE DRAWINGS

Figure 1:
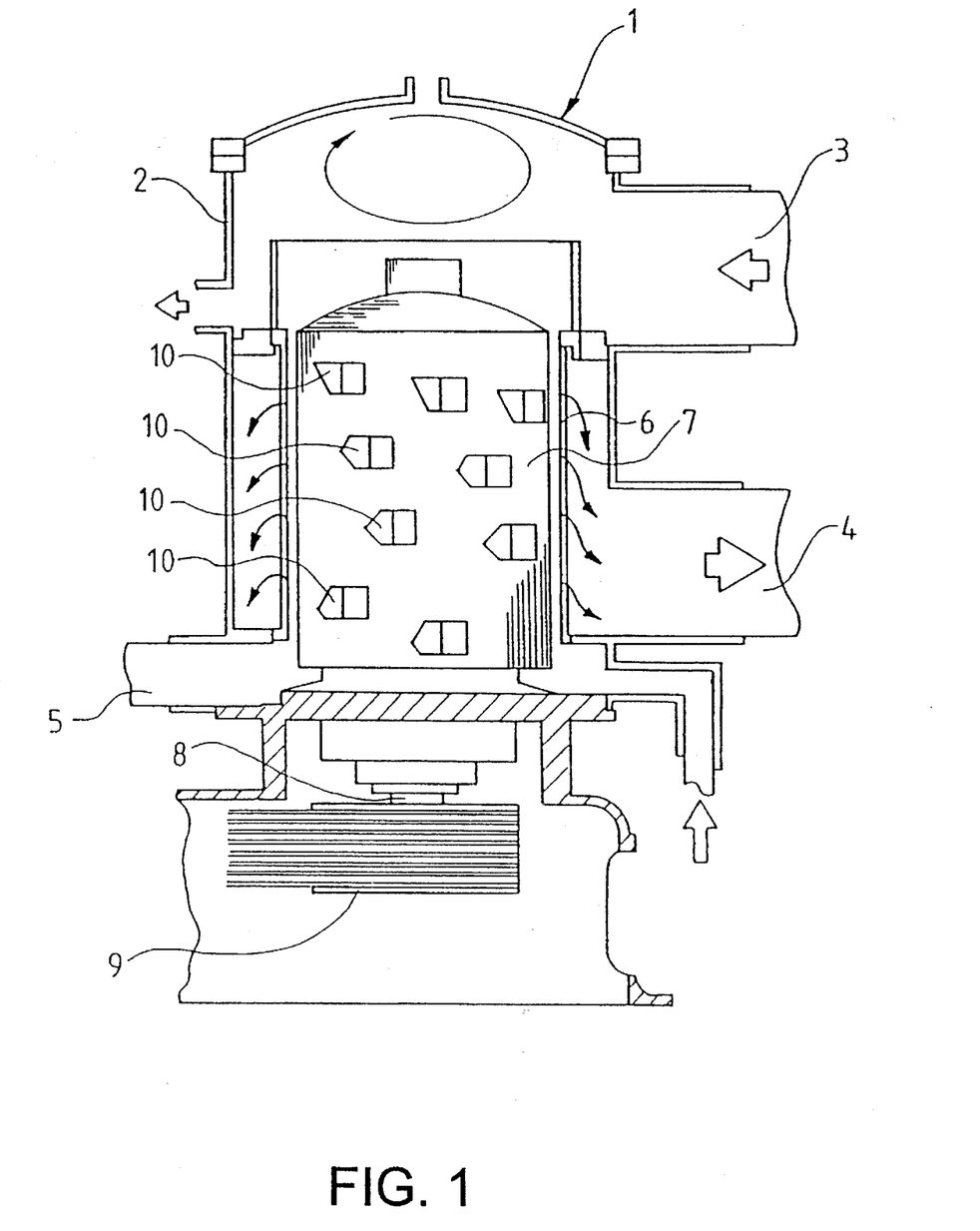

A screen apparatus 1 in accordance with a preferred embodiment comprises according to FIG. 1 an outer casing 2, conduits 3, 4 and 5 for the incoming pulp, accept and reject, respectively; a stationary screen cylinder 6; a substantially cylindrical or possibly conical rotor 7 and a shaft 8 thereof with drive means 9. The screen cylinder 6 may, in principle, be of any of the previously known type, but the best results in most cases are achieved by using a contoured screen cylinder according to FI Patent 67588. The apparatus in accordance with FIG. 1 operates mainly in such a way that the fiber suspension is fed in through conduit 3, from where it flows to a gap between the screen cylinder 6 and the rotor, more generally, a pulse member 7, to a so called treatment space. More generally, the pulp to be treated flows to the space on the side of the pulse member facing the screen cylinder, in other words, the pulse member is located in a space having pulp to be treated therein. The accept which has flowed through the openings of the screen cylinder—naturally the filtrate if a thickener is in question—is removed via conduit 4 and the pulp which has flowed down to the lower end of the annular gap between screen cylinder 6 and rotor 7 and is discharged from reject conduit 5. It is also appreciated from FIG. 1 that the surface of the rotor 7 facing the screen cylinder 6 is provided with members or elements 10, the shape of which may vary, for example, in a manner illustrated in FI patent 77279 depending on which zone, in other words, in which axial part of the rotor they are located.

The pulse member illustrated in FIG. 1, which is rotationally symmetric, usually cylindrical, but sometimes also conical, double conical or like, may be replaced in some cases also with a so called blade or foil device, which means that practically the whole interior of the screen cylinder is filled with fiber suspension. The pulse member is thus formed by foils mounted on the shaft by means of arms and the foils extend close to the screen surface so that fiber suspension is allowed to flow underneath the foil. Usually the distance of the foils from the screen surface is significantly smaller than, for example, that of the members illustrated in FI patent 77279.

FIG. 2 illustrates various surface types of the pulse member P known from the prior art. FIG. 2a illustrates a foil 20, arm 22 and a portion of the screen cylinder 6 in accordance with the above described foil rotor shown, for example, in U.S. Pat. No. 2,835,173. The rotational direction of the foil is illustrated with an arrow A, as also that of the other pulse members discussed in this connection. Alternatively, arrow B drawn with a broken line points out the direction, to which the screen cylinder 6 rotates, if the pulse member P is stationary. The leading edge 24 of the foil 20 directs a pressure pulse towards the screen surface 6, due to which both the accept pulp and also the reject particles in the pulp tend to flow through the screen cylinder 6. The trailing surface 26 of the foil 20 terminating to the trailing edge of the foil again causes a suction effect on the screen surface 6, by means of which the impurities possibly stuck on the screen surface are tended to be removed therefrom. However, since the foil 20 usually extends over the whole length of the pulse member, it is possible that the suction effect in a way axially moves to an area where the counter pressure over the screen is at its lowest, i.e. where the screen surface is also already otherwise open. On the other hand, it is not possible to increase the intensity of the negative pressure pulse generated by the foil by increasing the rotational speed of the foil or by increasing the inclination of the trailing surface, because the power consumption increases almost by the square of the speed and the mechanical stress on the screen cylinder directly relative to the speed.

Figure 2A:
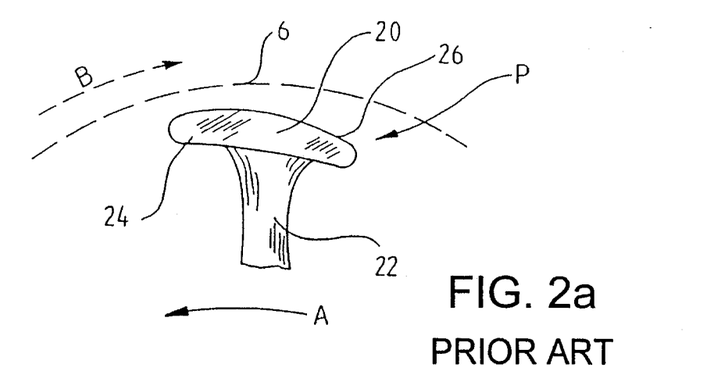
FIGS. 2a–d illustrate part sectional views of prior art rotors.
Figure 2B:
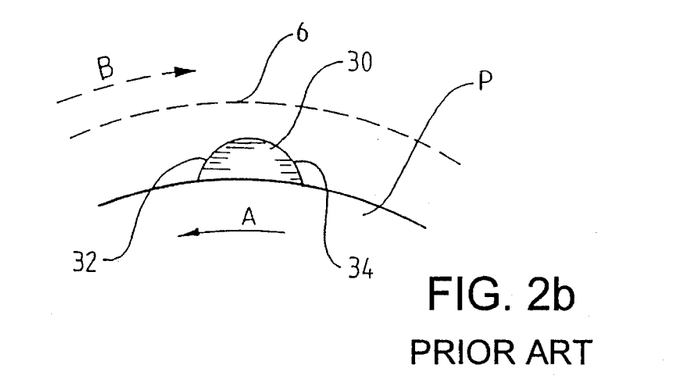

FIG. 2b illustrates a protrusion 30 of a so called bump rotor, which is shaped as a spherical cap and which merely due to its shape directs a considerably weak pressure pulse to the screen surface with its leading surface 32 and respectively a similar weak suction pulse on the trailing surface 34. Moreover, the shape of the bulge directs the suction pulse to the free sides, where the pressure pulse easily dies out.

Figure 2C:
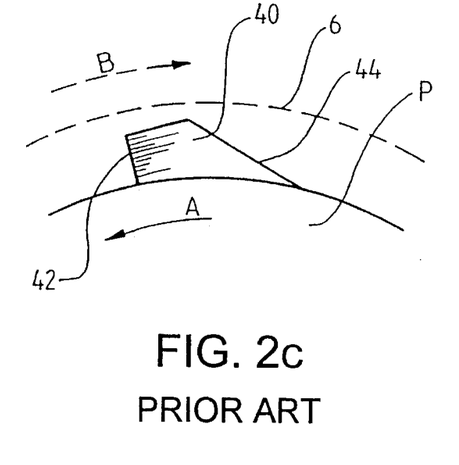

FIG. 2c illustrates a pulse means 40, a so called bulge of a rotor illustrated, for example, in U.S. Pat. No. 5,000,842, which bulge by means of a leading surface 42 both accelerates the circumferential flow velocity of the pulp and subjects the screen surface to a positive pressure pulse and draws off with the trailing surface 44 fibers stuck to the screen surface 6.

Figure 2D:
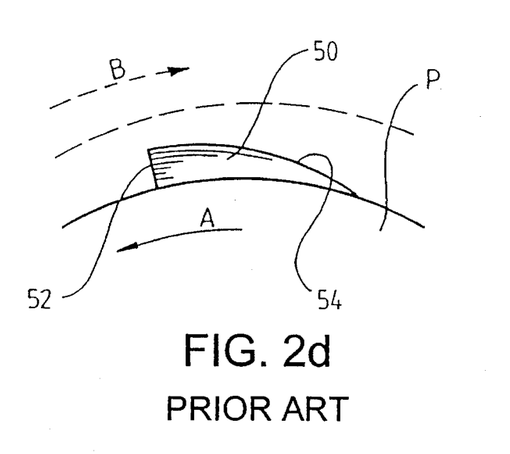

FIG. 2d illustrates yet another rotor embodiment 50, which is illustrated, for example, in U.S. Pat. No. 4,981,583. Said pulse member generates with its leading surface 52 a positive pulse for a short time, by which the accept is pressed through the screen cylinder 6 with its trailing surface and a negative pulse for a longer time, by which fibers are drawn off from the screen surface.

It is characteristic of all the above mentioned embodiments of FIGS. 2a–2d that a stronger pulse cleaning the screen surface might be generated than what is used today, but it would then be necessary to bring the pulse member so close to the screen surface that it would cause problems. Foreign objects entering the screening apparatus, such as nuts, gravel and knots, would break the screen cylinder when entering the space between the pulse member and the screen cylinder. When the distance between the leading surface of a protrusion on the rotor and the screen cylinder is small fibers would also flow to the openings of the screen surface so vigorously that their removal would only be possible with a mechanical scraper.

Figure 3A:
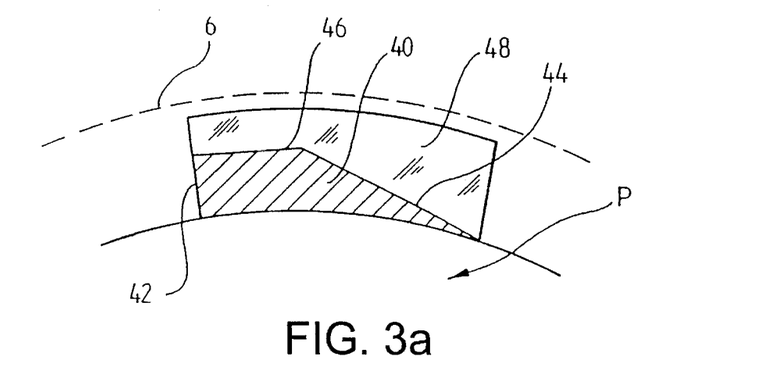
FIGS. 3a–j illustrate preferred embodiments of pulse members in accordance with the present invention.
Figure 3B:
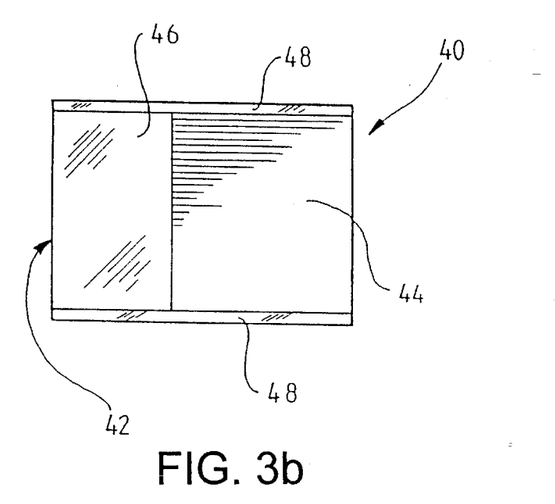
Figure 3C:
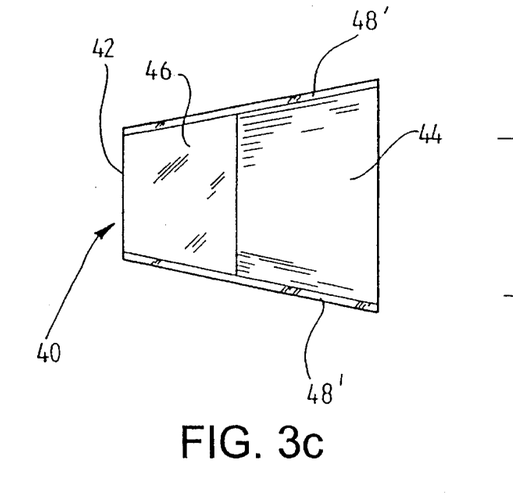
Figure 3D:
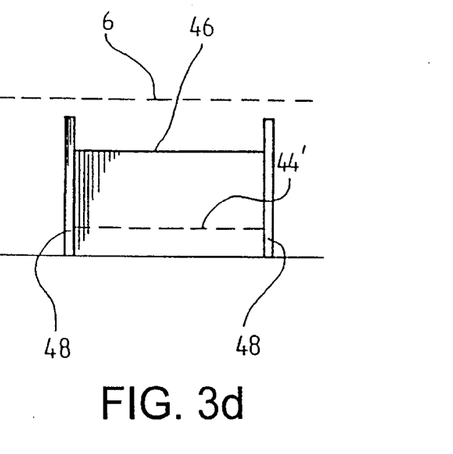
Figure 3E:
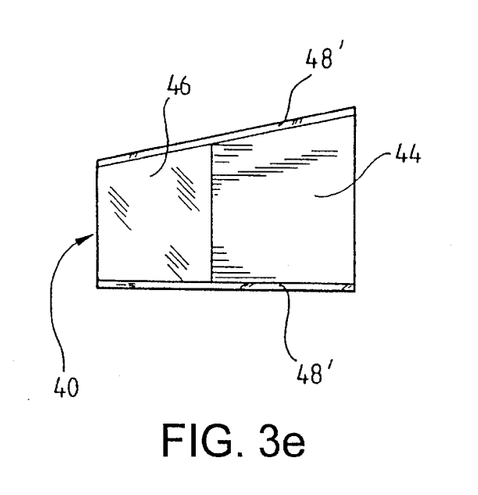
Figure 3F:
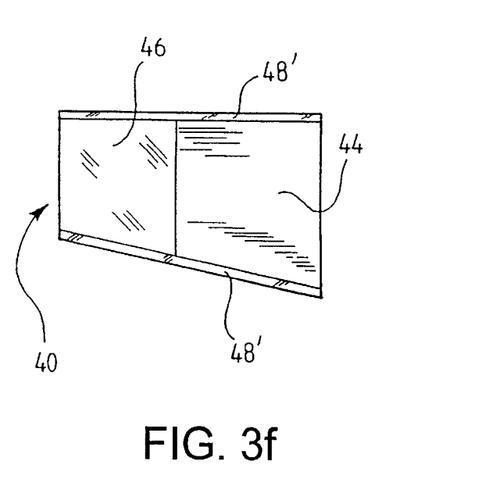
Figure 3G:
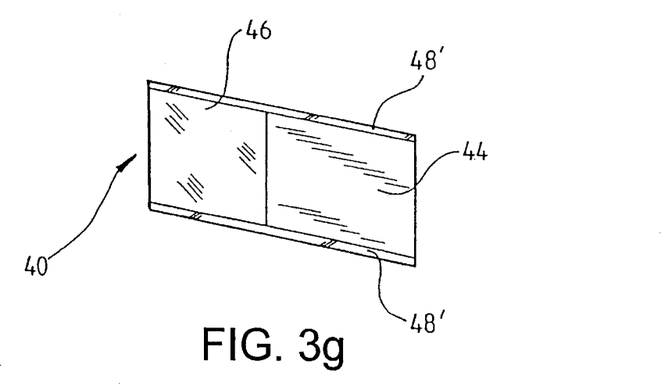

FIGS. 3a–3g exemplify a pulse member P with the pulse means 40 illustrated in FIG. 2c. The trailing surface 44 which is important for the cleaning of the screen surface of the pulse element, i.e. bulge 40 of the pulse member and also the axially spaced side faces of the surface 46 parallel to the screen surface 6 are provided with wings 48 extending according to this embodiment significantly closer to the screen surface than surface 46. The purpose of the wings 48 is to prevent the suction pulse generated by the trailing surface 44 and also partially by the surface 46 from escaping to the sides of the bulge 40 so that the suction pulse practically completely hits the screen surface, which is the mere purpose of said suction pulse. FIG. 3d is a front view of a bulge in accordance with FIG. 3a. The strength of the suction pulse is in practice directly proportional to the relation of the surface area between the surface 46, wings 48 and screen surface 6 to the cross-sectional surface area of a flow channel which the trailing surface 44 at each time encounters. In other words when the cross-sectional area of the flow channel increases, also the negative pressure respectively increases. FIG. 3d illustrates with a broken line 44' the position at the trailing surface 44, where the cross-sectional area of the flow channel between the bulge 40 and the screen surface is approximately double to the cross-sectional area above the surface 46. Consequently, the height, width and length of the bulge 40 in practice determine the strength of the suction pulse. It may also be stated that the gentler the trailing surface is, the more slowly the pressure difference increases and the more the leaks, etc. affect the amount of the negative pressure. The power consumption of the pulse member significantly increases if the bulge is made higher, whereby the widening of the trailing surface by arranging the wings 48' so that the bulge 40 is wedge-shaped as in FIG. 3c, enables the increase in the intensity of the suction pulse with slightly less energy consumption.

Figure 3H:
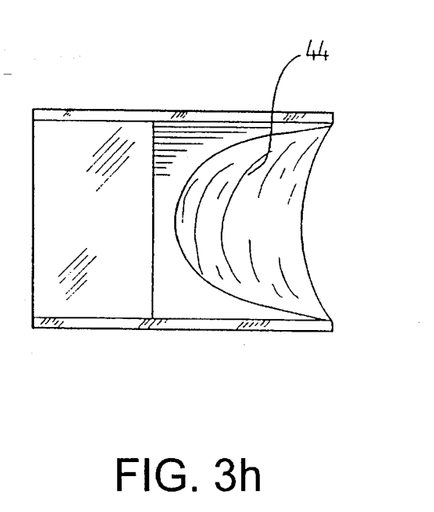
Figure 3I:
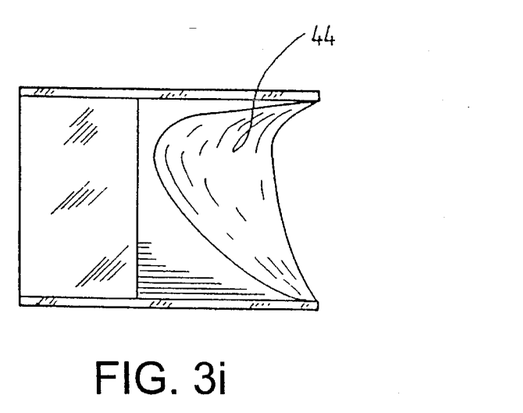
Figure 3J:
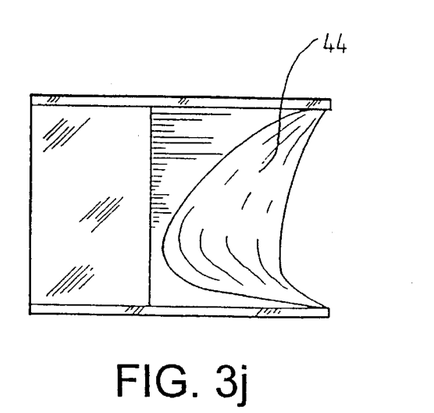

As for the construction of the bulge and the wings, there are almost an uncountable number of alternatives. The so called bulge may be formed of elements polygonal in longitudinal cross-section as shown in the drawings, but also of elements triangular in-cross-section, the leading edge of the leading surface thereof extending closest to the screen surface. Also the sloping trailing surface of the bulge may be either straight or curved. In some cases the wing does not have to extend closer to the screen surface than the leading edge of the bulge, but the wings may be found only at the sides of the sloping trailing surface. Preferably the clearance between the outer edges of the wings and the screen cylinder is substantially the same as the distance between the leading edge of the bulge and the screen cylinder. The wings may be either straight or curved of their shape and their outer edge facing the screen surface may also be either straight or curved following the shape of the screen surface. The bulge may also be manufactured so that no wings are attached thereon or on the sides thereof, but a blank is used, which is for example a flat piece having a rectangular crosssection, on the surface of which a recess is machined so that the side edges of the recess remain higher thus corresponding to the wings. The shape of the recess may, of course, be either rectangular, concave, curved from the corners or also tapered from the corners. FIGS. 3e–3j further illustrate alternatives in the direction of the wings or the like. In FIGS. 3h–3j a number of embodiments are illustrated, in which the sloping trailing surface of the bulge is not planar but concave. In FIG. 3h the trailing surface is symmetrical to the longitudinal axis of the bulge, whereas in FIGS. 3i and 3j the concave trailing surface is non-symmetrical. This kind of concave trailing surfaces may, of course, be applied to all embodiments shown in FIGS. 3c, 3e–3g, as well as to all other embodiments coming into question.

Figures 4A, 4B:
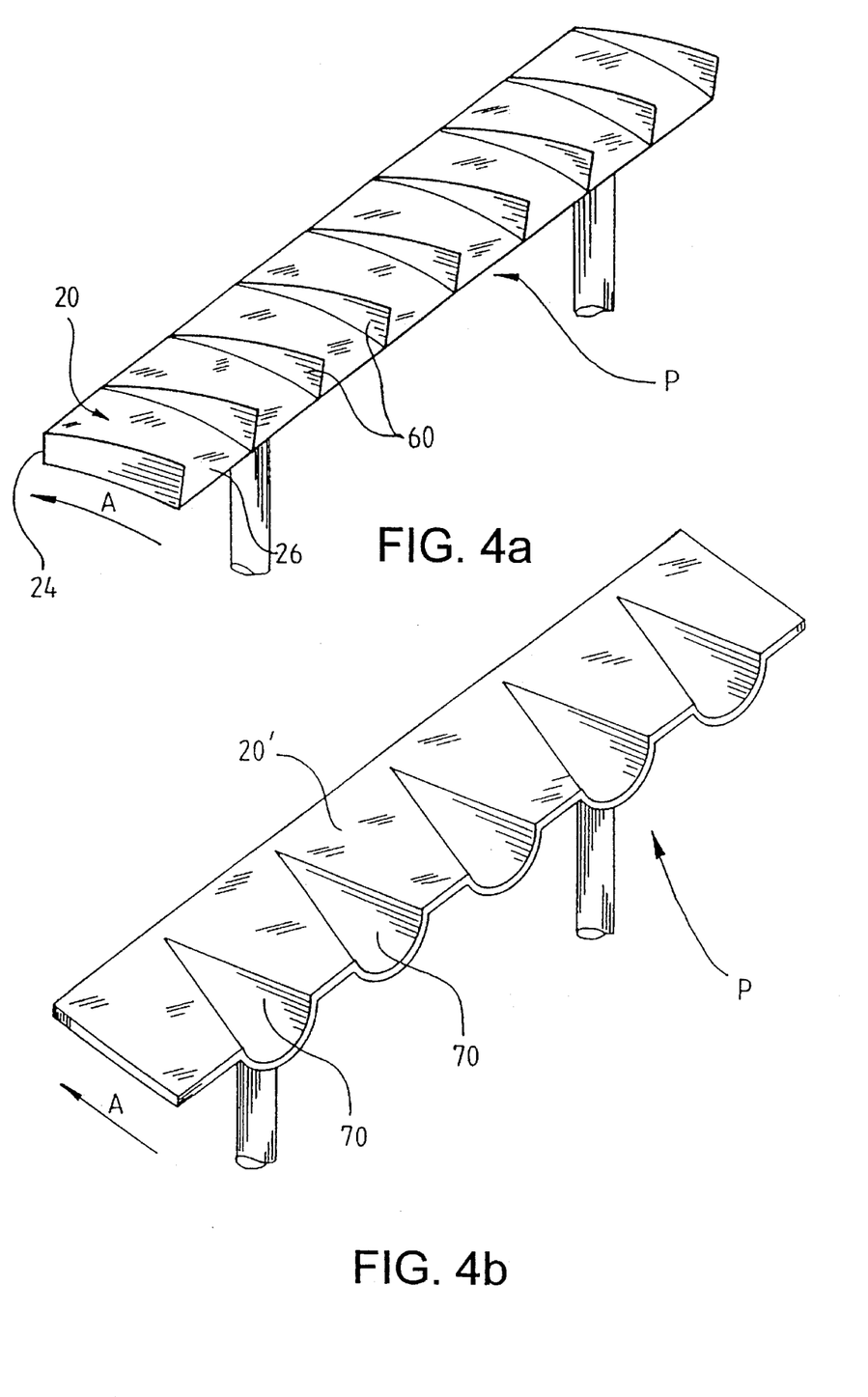
FIGS. 4a–d illustrate another preferred embodiments of pulse members in accordance the present invention.
Figure 4C:
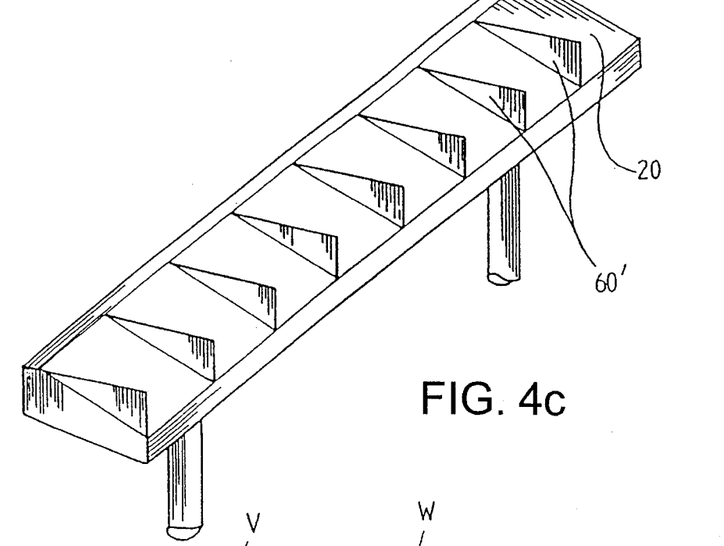
Figure 4D:
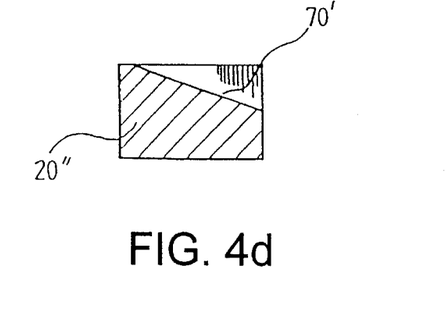

FIGS. 4a–4d illustrate a preferred arrangement in accordance with the present invention mainly applied to a foil-type rotor i.e. pulse member P. However, the embodiments of FIGS. 4a, 4c–4g may as well be applied to a cylindrical rotor in such a way that the "foils" are mounted as such on the surface of the rotor i.e. without using arms to fasten the foils to their shaft. An embodiment illustrated in FIG. 4a is a conventional foil 20 of the foil rotor P, the surface of which facing the surface of the screen cylinder is closer to the screen cylinder 6 of its leading edge 24 than of its trailing edge 26. The surface of the foil 20 in the embodiment of the drawing is provided with wings 60 extending to the proximity of the surface of the screen cylinder said wings being preferably upright relative to the surface of the foil 20 and mounted on the foil perpendicular to the axis of the pulse member P and preferably equally spaced from each other. As a result of wings 60 flow channels are generated between the foil and the screen surface the cross-section of which channels is rectangular and the cross-sectional surface area increases from the leading edge of the foil backwards towards the trailing edge. By using such a method the suction generated by the foil rotor P may be better directed towards an appropriate area of the screen cylinder, whereby the cleaning effect of the foil intensifies substantially. Of course, it is also possible to arrange the wings 60, 60' to a slightly inclined position from said upright plane either so that the wings 60' are mutually parallel or so that the inclination thereof changes. When said inclination changes the channels formed between the wings may either all or only a portion thereof widen. The blade shown in FIGS. 4c and 4d is substantially thick and the wings 60' on the sloping trailing surface of the blade are, in accordance with a preferred embodiment, formed such that the channels between the wings are machined in the blade, whereby the material left between the channels forms the wings. The wings may be either positioned to a radial plane or they may be positioned with their longitudinal axis inclined with said radial plane. The angle of inclination of their longitudinal axis is preferably less than 45°. According to another embodiment the foil itself is formed of a very thin plate, whereby it does not direct with its leading edge practically any pressure pulse to the screen surface. The wings are then preferably welded or by some other appropriate means fastened on the foil. According to yet another embodiment the leading surface of the foil is either parallel to the radius of the screen cylinder (4d) or it is slightly inclined therefrom. Said inclination angle being, however, less than 30 degrees in both directions.

A further alternative is to construct a foil 20' of a pulse member P, for example, of plate material according to FIG. 4b. A thin plate is desired, because by using such, as mentioned already above, a weaker pressure pulse towards the screen surface is obtained, which is an advantage, because said pulse types tend to clog the openings of the screen surface. A significant application worth mentioning for a foil manufactured of plate material is a rotor used with a so called wire screen, because the wire screen does not endure great pressure pulse. The weaker the pressure pulse on the screen cylinder thus is, the better the wire screen lasts, in other words the more reliable and secure it is in use.

Figure 4E:
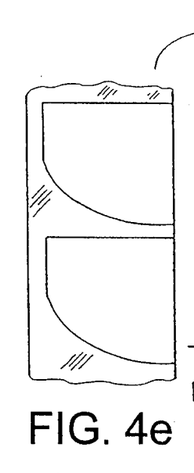
Figure 4F:
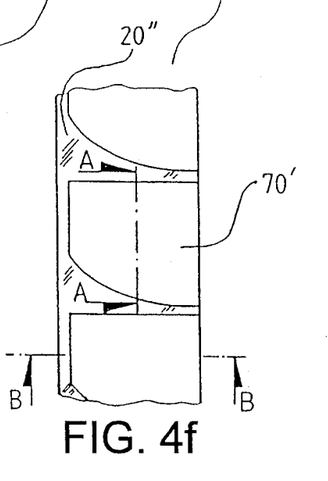
Figure 4G:
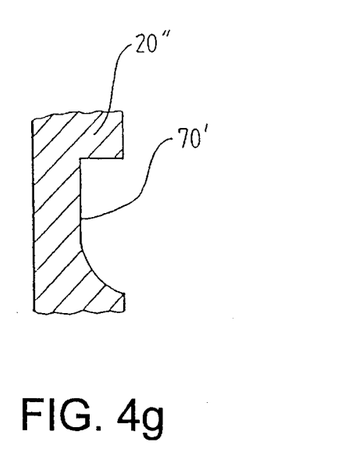

Channels 70 are pressed or otherwise formed according to FIG. 4b on the foil P manufactured of plate material so that local suction zones are directed above the channels to the screen cylinder. By arranging said zones interlacing on different foils the whole screen surface may be cleaned during each rotation of the pulse member either once or several times, see FIGS. 4e and 4f showing two foils in sequence. An advantage of this kind of arrangement is that the direction of the plane of the foil 20' itself may be maintained the same as that of the screen surface, whereby the flow resistance substantially decreases compared with a conventional foil rotor. Of the same reason a foil in accordance with this embodiment may be manufactured of significantly lighter materials, because the pressure of the suspension does not press the underside of the foil towards the screen cylinder. Only the negative pressure generated in front of the channels 70 draws the foil towards the screen cylinder. The shape and direction of the above mentioned channels may be of any above described type. In accordance with a preferred embodiment the leading edge of the blade P is linear and solid so that the channels 70 do not extend to the leading edge of the blade but begin at a distance from said leading edge.

It is also possible to manufacture the channels (FIG. 4d) so that grooves 70' are machined on a for example rectangular foil blank 20", forming thus said channels. The blade is radially rather thick and its leading surface forms an angle of +−30° with respect to the radial direction. The channels machined in the blade may be any cross-sectional shape shown in FIGS. 3a–3i, also other shapes are applicable as far as they perform the function the channels are supposed to do. In the embodiment of FIG. 4d the bottom of the channels is not even, but rounded on one side so that the top view thereof is not symmetric anymore. The shape of said channel may, however, vary from exactly perpendicular or from V-shaped to a curved bottom design. FIG. 4d also illustrates how two subsequent foils V and W are arranged in such a way that the grooves 70' thereof are located interlacing so that the groove cleaning the screen surface of foil W following the first foil begins at the height where the bottom of the groove on the foil V changes from planar to curved. By such a method the whole screen cylinder is covered with equally cleaning suction stage. Said foil-like pulse members may be manufactured, of course, as well as the conventional foil-like pulse members of the prior art of conventional metal or of ceramics or composite material or of a compound thereof.

The arrangement in accordance with our invention is not affected by the fact whether the same member is used for rotating the pulp along the screen surface or it is carried out by another member, whereby the cross-sectional design of the foil is irrelevant. However, it should be born in mind that since one object of the present invention is to prevent the formation of radial pressure pulses towards the screen cylinder one should avoid using rotor structures which create such a pressure pulse. For instance, rotor structures having a leading surface sloping towards the screen cylinder in an angle of less than 30° should be avoided as they create a strong pulse towards the screen surface.

Figure 5A:
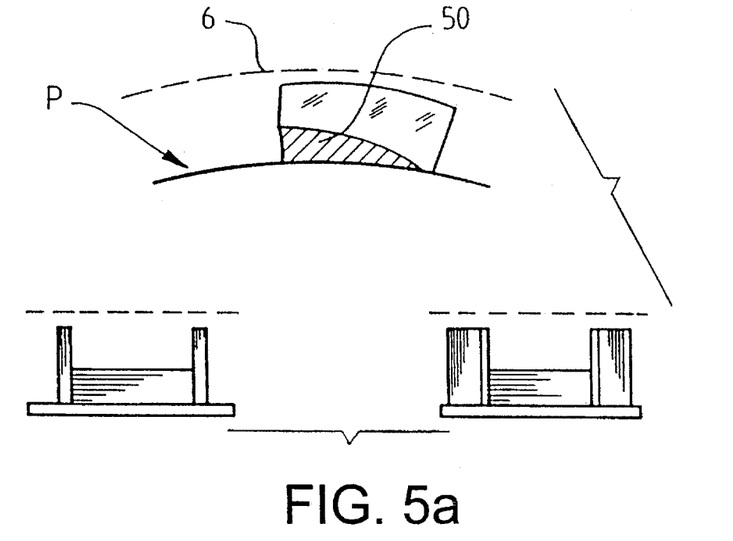
FIGS. 5a–b illustrate further preferred embodiments of pulse members in accordance with the present invention.
Figure 5B:
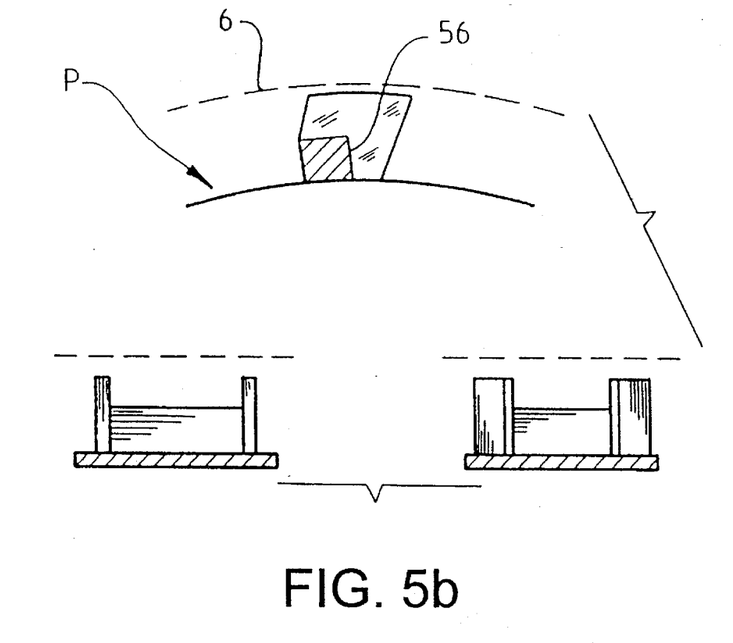

FIGS. 5a and 5b yet illustrate a number of different surface arrangements of pulse member P in accordance with the present invention, which all have the typical feature that the side faces of the protrusion on the surface of the pulse member P are provided with wings or plates, which extend close to the screen surface 6 thus preventing the negative pressure from "escaping" to the sides of the protrusion. The protrusion may be either a rectangular element (FIG. 5b) or an element provided with a leading surface perpendicular to the rotor surface and a curved or sloping trailing surface (FIG. 5a), the side faces of all of which are provided with wings either substantially in a radial plane or in a direction deviating therefrom in such a way that the width of the channel between the protrusion and the screen surface parallel to the axis of the rotor increases. Or at least the cross sectional area of the channel widens along the trailing surface away from the leading surface.

It may be generally stated that the distance of the protrusions on the surface of the pulse member, either a foil or a cylindrical or even conical or like member, from the screen surface is conventionally maintained between some millimeters to more than 10 millimeters. Now the distance of said wings from the screen surface preferably varies from one to four millimeters. It may be appreciated from the performed tests that the cleaning ability of the screen surface of the pulse member provided with such plates is quite different from the pulse members in accordance with prior art.

It has also been noted in practice, as is obvious, that it is not reasonable to arrange channels cleaning the screen surface to circumferential rows round the rotor, but interlacing to some extent so that a cleaning suction effect may be generated all over the screen surface. So, for example, when foil rotors are used it is possible and preferable to arrange the channels in the subsequent foils either completely or partially interlacing. Further, it is to be noted that one of the main objects of the invention is to create a zone of negative pressure between a pulse member and the screen surface. This is done by arranging the foil so that its clearance from the screen surface increases towards the trailing edge thereof. Another object of the invention is to prevent the negative pressure from escaping to the sides of said zone. This may be done by means of arranging wings or like members extending close to the screen surface to the sides of said zone. In order to ensure that the foils of a foil-type pulse member and especially its elements creating a negative pressure; channel portion, recess, groove or like, function efficiently the foil should preferably extend from the first (usually the upper) axial end of the rotor to the second (usually the lower) axial end thereof. If it is not possible, there should be as many channel portions adjacent each other as possible and at least two channel portions per each foil. If only one channel portion is used the negative pressure created between the foil and the screen surface is much easier able to escape from all directions. Additionally, the shorter the foil is the greater disturbing effect the axial ends of the foil create on the flow characteristics of the foil so that a very short foil cannot at all fill its supposed function.

Also it is a further object of the invention to prevent the negative pressure from escaping towards the trailing edge of the foil. This may be done by arranging the trailing edge of the foil to extend in radial direction in such a way that the negative pressure between the foil and the screen surface does not that easily draw material from underneath the foil. Another way to perform the same function is to arrange the pulse member on the surface of a closed rotor body in such a way that the underside of the pulsing member is entirely closed, i.e. fasten the bulges on a cylindrical rotor, for instance.

Figure 6:
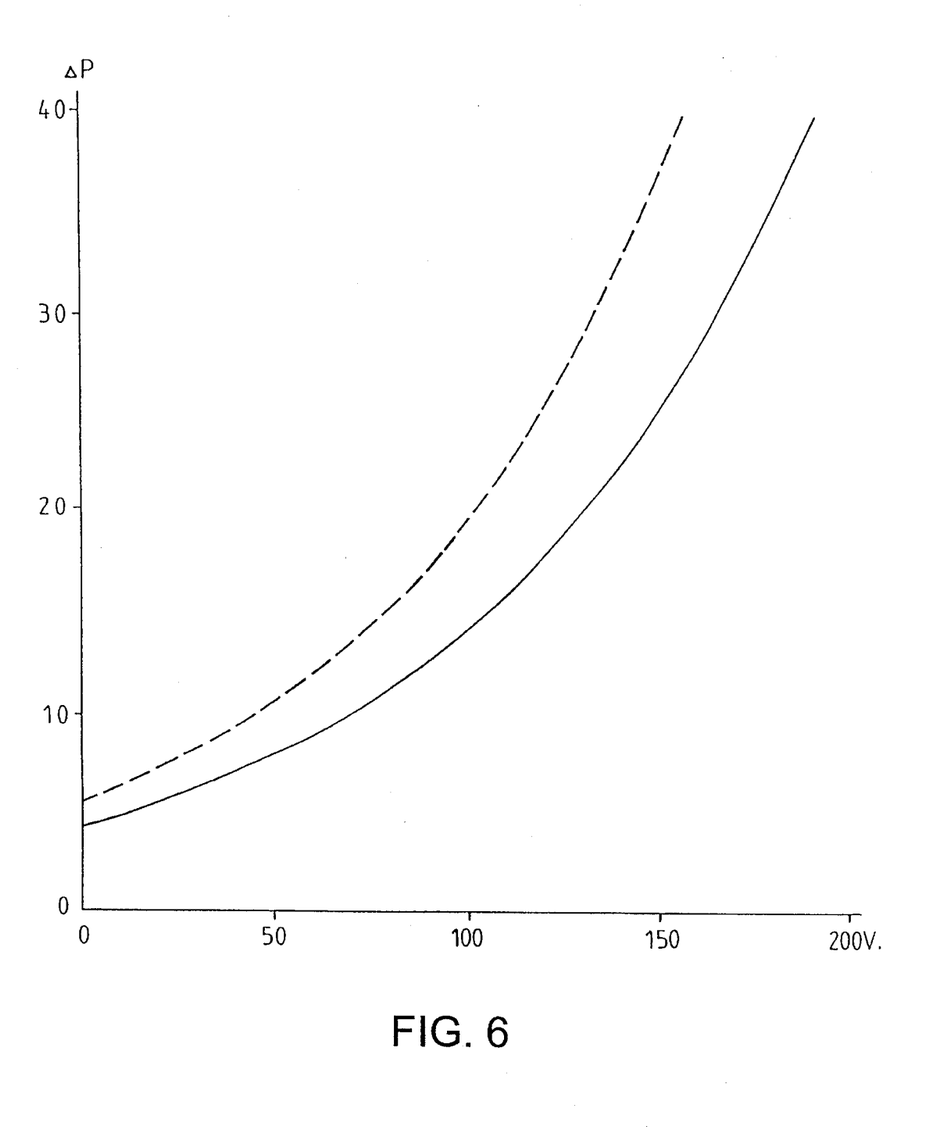
Figure 7:
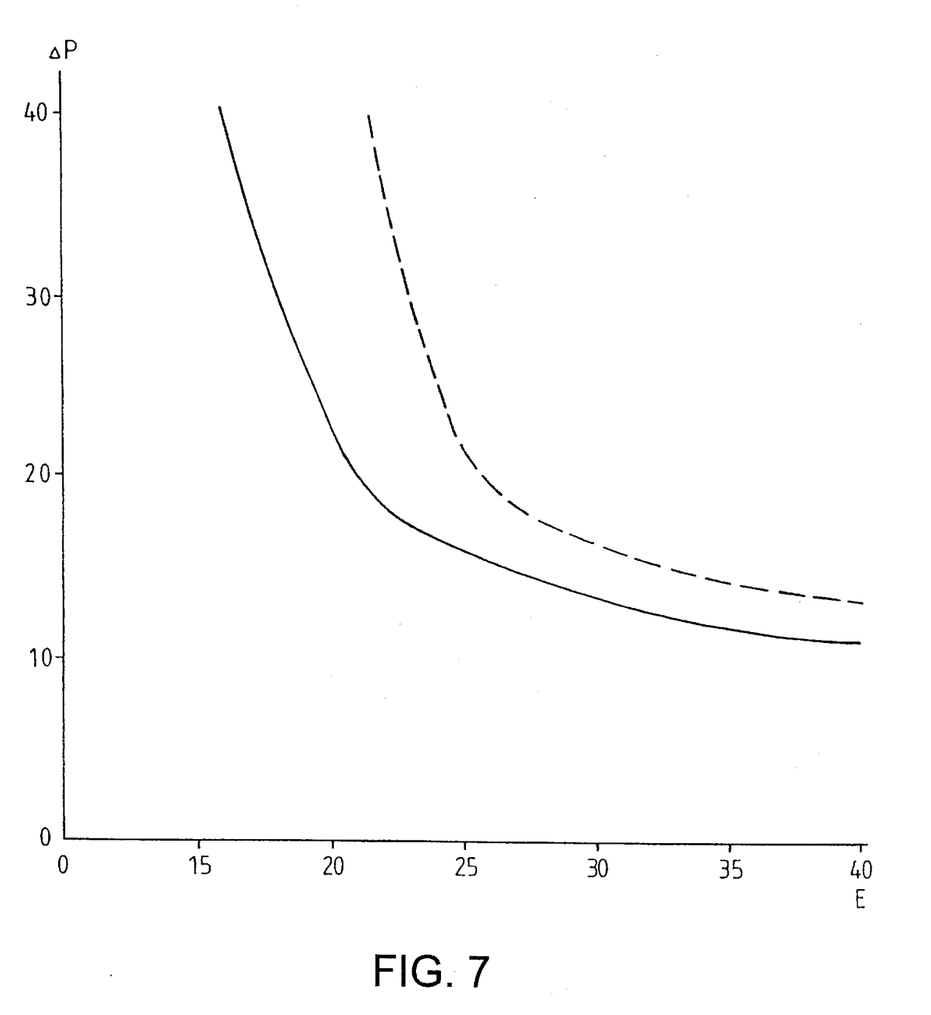

As an example of measures relating to a couple of preferred embodiments of the present invention the following data is given:

I Cylindrical rotor Diameter of the rotor Axial length of the rotor Radial height of a bulge Axial width of a bulge Distance of the bulge upper surface from the screen surface II Foil-type rotor Axial length of the foil Circumferential length of the foil Thickness of the foil Distance between the wings Gap between the foil and the screen surface FIGS. 6 and 7 graphically illustrate test results obtained by a rotor in accordance with the present invention, in other words with FIG. 4c compared with a rotor in accordance with prior art shown in FIG. 2a. The broken line in the drawings represents a conventional prior art rotor and a continuous line a rotor in accordance with the present invention. The tests in practice were performed with TMP-pulp, the consistency of which was 1.0%. First both the pulp flow graph and the energy consumption graph as a function of pressure difference were tested by using the rotor in accordance with the prior art. Thereafter wings were mounted on the rotor surface according to FIG. 4c in such a way that the inclination of the plate was about 15° and the distance between adjacent wings in the direction of the foil is about 25 mm, and similar test runs were performed. It may be appreciated from the test results that, for example, the pressure difference p=20 when using a rotor in accordance with the present invention gives a 30% higher volume of the pulp flow V. Or vice verse a particular pulp flow V (150) may be obtained with a more than 30% lower pressure difference p.

The above given test results prove the already above described theory that by arranging channels on the surface of the pulse member, which channels open in the flow direction, it is possible to considerably intensify the cleaning of the screen surface, which results to a lower energy consumption of the apparatus and a higher capacity. It is characteristic of the above mentioned channels in the present invention that they are "closed" from the end receiving the flow, in other words according to a preferred embodiment they do not extend to the leading edge of the pulse member receiving the flow, but begin almost immediately thereafter.

Although the above description only mentions that the screen cylinder may also be rotatable and the pulse members stationary, said construction also belongs to the scope of the present invention. Also thickening applications, in which a constructionally similar apparatus is used, may be utilized, although the above description almost only teaches about screening, accept, reject, etc. Of course, in thickening the filtrate corresponds to the accept of the screening and the thickened pulp to the reject. Furthermore, in the thickening process the fiber matting thickened on the screen surface corresponds to the fibers or other reject particles being removed from the screen surface. It is, of course, possible that an apparatus in accordance with the present invention is used also for screening other materials than for screening fiber suspensions of the pulp and paper industry.

As becomes apparent from above, by using the apparatus in accordance with the present invention it has been possible to eliminate or minimize the defects of the apparatuses in accordance with the prior art and at the same time the maximum capacity of the screen apparatus has increased considerably when it has been secured that the screen cylinder remains more easily than before clean, although the screening pressures used are higher than before. At the same time the rotational velocities of the rotatable member, either the pulse member or the screen cylinder, may be reduced, which again decreases the demand of power and wearing of both the pulse member and the screen plate. However, it must be noted that the above described embodiments are only exemplary, which are by no means given to restrict the present invention from what is given in the accompanying claims, which alone determine the scope of invention. Thus all details and their variations in the above description and in the enclosed drawings may be combined with each other as long as the pulse member performs the function it has been given.

We claim:

1. Apparatus for treating a fiber suspension comprising: an outer casing; a plurality of conduits for introducing fiber suspension into said outer casing and for discharging two fractions of suspension therefrom a screen cylinder having a screen surface; a pulse member having an axis and at least one continuous surface facing said screen surface, said continuous surface having a leading edge and one of a trailing surface and a trailing edge, and a circumference; at least one of said screen cylinder and said pulse member being rotatably mounted on a shaft; said at least one continuous surface facing said screen cylinder being provided with at least two substantially circumferential channels, said channels having a cross-sectional area increasing away from said leading edge which said channels causing said screen surface of said screen cylinder to be subjected to a strong suction effect to maintain said screen surface clean.

2. Apparatus in accordance with claim 1 wherein said channels are formed between wings which extend from said continuous surface of said pulse member to the proximity of said screen surface of said screen cylinder.

3. Apparatus in accordance with claim 2 wherein said wings are either straight or curved plates.

4. Apparatus in accordance with claim 2 wherein said wings are disposed in an inclined position at an angle of inclination relative to a plane perpendicular to said axis of said pulse member.

5. Apparatus in accordance with claim 9 wherein said angle of inclination of said wings or said recesses or grooves is less than 45 degrees.

6. Apparatus in accordance with claim 2 wherein said wings are disposed in an inclined position relative to a plane perpendicular to said axis of said pulse member in such a way that said angle of inclination increases as said channels increase in cross-section.

7. Apparatus in accordance with claim 2 wherein the distance of said wings from said screen surface is between about 1.0–4.0 mm.

8. Apparatus in accordance with claim 2 wherein said at least one foil has a leading surface having an angle of inclination with respect to a radial direction from said shaft, said inclination angle being less than 30 degrees.

9. Apparatus in accordance with claim 1 wherein said pulse member is formed of at least one foil providing said continuous surface,; said continuous surface being provided with wings extending in the proximity of said screen surface of said screen cylinder.

10. Apparatus in accordance with claim 9 wherein said at least one foil extends at least partially over the entire axial length of said screen surface.

11. Apparatus in accordance with claim 9 wherein said at least one foil extends in the axial direction over the entire axial length of said screen surface.

12. Apparatus in accordance with claim 9 wherein said pulse member is rotatably mounted to said shaft and said at least one foil is attached to said shaft by means of at least one arm allowing fiber suspension to flow underneath said foil.

13. Apparatus in accordance with claim 9 wherein said at least one foil is manufactured of metal, ceramics, composite material, or a combination thereof.

14. Apparatus in accordance with claim 9 wherein said at least one foil is made of plate material.

15. Apparatus in accordance with claim 9 wherein there are at least two foils, and said channels, of said foils are interlaced.

16. Apparatus in accordance with claim 1 wherein said pulse member is formed of at least one foil having a surface facing said screen surface, said foil surface being provided with recesses or grooves forming said channels.

17. Apparatus in accordance with claim 16 wherein said recesses or grooves are disposed in an inclined position at an angle of inclination relative to a plane perpendicular to said axis of said pulse member.

18. Apparatus in accordance with claim 16 wherein said at least one foil is made of a substantially rectangular blank by machining said grooves or recesses therein.

19. Apparatus as recited in claim 16 wherein said angle of inclination of said recesses or grooves is less than 45°.

20. Apparatus as recited in claim 16 wherein the distance between said foil surface and said screen surface is between about 1.0–4.0 mm.

21. Apparatus in accordance with claim 1 wherein said pulse member is rotatable and said screen cylinder is stationary.

22. Apparatus in accordance with claim 1 wherein said pulse member is stationary and said screen cylinder is rotatable.

23. Apparatus in accordance with claim 1 wherein said channels begin at said leading edge of said at least one continuous surface.

24. Apparatus for treating a fiber suspension, comprising:
an outer casing;
a plurality of conduits for introducing fiber suspension into said outer casing and for discharging two fractions of suspension therefrom;
a screen cylinder having a screen surface;
a pulse member having an axis and at least one continuous surface facing said screen surface, said continuous surface having at least one element with a leading surface and a trailing surface and a circumference;
at least one of said screen cylinder and said pulse member being rotatably mounted on a shaft; and
said element provided with at least one substantially circumferentially extending channel, said channel having a cross section of area along said trailing surface away from said leading surface, said at least one channel causing said screen surface of said screen cylinder to be subjected to a strong suction effect to maintain said screen surface clean.

25. Apparatus in accordance with claim 24 wherein said at least one channel is formed between wings which extend from said element to the proximity of said screen surface of said screen cylinder.

26. Apparatus in accordance with claim 25 wherein said trailing surface has a center portion, and wherein said wings are formed by machining said trailing surface of said element concave in such a way that axially opposed edges of said trailing surface are formed, said edges remaining higher than said center portion of said trailing surface.

27. Apparatus in accordance with claim 25 wherein said wings comprise either straight or curved plates.

28. Apparatus in accordance with claim 25, wherein said wings are disposed or said edges are machined in an inclined position at an angle of inclination relative to a plane perpendicular to the axis of said pulse member.

29. Apparatus in accordance with claim 28 wherein said angle of inclination is less than 45 degrees.

30. Apparatus in accordance with claim 25 wherein said wings are disposed or said edges are machined in an inclined position at an angle of inclination relative to a plane perpendicular to the axis of said pulse member in such a way that said angle of inclination increases, as said channel increases in cross-section.

31. Apparatus in accordance with claim 25 wherein the distance of said wings or said edges from said screen surface is about 1.0–4.0 mm.

32. Apparatus in accordance with claim 24 wherein said element is a protrusion having two axially opposed side faces, said side faces being provided with wings extending in the proximity of said screen surface of said screen cylinder.

33. Apparatus in accordance with claim 32, wherein said protrusion extends substantially over the entire axial length of said pulsing member.

34. Apparatus in accordance with claim 24 wherein said element comprises a protrusion provided with a number of wings extending in the proximity of said screen surface of said screen cylinder.

35. Apparatus in accordance with claim 24 Wherein said element comprises a protrusion provided with recesses or grooves forming said at least one channel.

36. Apparatus in accordance with claim 24 wherein said pulse member is substantially cylindrical, conical, or otherwise rotationally symmetrical.

37. Apparatus in accordance with claim 24 wherein said pulse member is rotatable and said screen cylinder is stationary.

38. Apparatus in accordance with claim 24 wherein said pulse member is stationary and said screen cylinder is rotatable.

39. Apparatus in accordance with claim 24 wherein there are at least two channels on said surface of said pulse member, said channels being interlaced.

40. Apparatus in accordance with claim 24 wherein said leading surface of said element forms an angle of less than 30 degrees with respect to a radial direction from said shaft.

* * * * *